US005084628A

United States Patent [19]

Burge et al.

[11] Patent Number: 5,084,628

[45] Date of Patent: Jan. 28, 1992

[54] SHEET INSPECTION METHOD AND APPARATUS HAVING RETROREFLECTING MEANS

[75] Inventors: Anthony R. Burge; Michael Potter, both of Hants, England

[73] Assignee: De La Rue Systems Ltd., England

[21] Appl. No.: 551,897

[22] Filed: Jul. 12, 1990

[30] Foreign Application Priority Data

Jul. 13, 1989 [GB] United Kingdom ................. 8916033

[51] Int. Cl.$^5$ ................................ G01V 9/04

[52] U.S. Cl. ........................ 250/571; 356/430

[58] Field of Search ............... 250/571, 572, 562, 563, 250/225; 356/430, 431, 238

[56] References Cited

U.S. PATENT DOCUMENTS

| | | | |
|---|---|---|---|
| 3,588,513 | 6/1971 | Hiroo | 356/430 |
| 3,594,087 | 7/1971 | Victor | 250/571 |
| 3,859,538 | 1/1975 | Mannonen | 250/572 |
| 4,368,982 | 1/1983 | Van Arnam et al. | 250/571 |
| 4,380,396 | 4/1983 | Arndt et al. | 356/432 |
| 4,709,145 | 11/1987 | Spillman, Jr. | 250/225 |

FOREIGN PATENT DOCUMENTS

| | | |
|---|---|---|
| 101115 | 7/1983 | European Pat. Off. . |
| 182471 | 9/1985 | European Pat. Off. . |
| 218865 | 8/1986 | European Pat. Off. . |
| 304805 | 8/1988 | European Pat. Off. . |
| 2054835 | 7/1979 | United Kingdom . |

*Primary Examiner*—David C. Nelms
*Assistant Examiner*—Que T. Le
*Attorney, Agent, or Firm*—Ostrolenk, Faber, Gerb & Soffen

[57] ABSTRACT

Holes, tears and missing portions in a sheet, such as a banknote, are detected. The sheet is irradiated with radiation so that the radiation passes through the sheet with a relatively low degree of attenuation in areas where holes, tears and missing portions do not exist and with a relatively high degree of attenuation in areas where holes, tears and missing portions exist. The attenuated radiation is retroreflective back through the sheet and is then received by appropriate photodetectors. Since the sheet is relatively opaque and the radiation passes through the same points in the sheet twice, the contrast between the received radiation having passed through the holes, tears and missing portions and the received radiation passing through the relatively opaque sheet is very high making it simple to differentiate between those areas and thereby to positively detect holes, tears and missing portions in the sheet.

13 Claims, 4 Drawing Sheets

Fig.5.
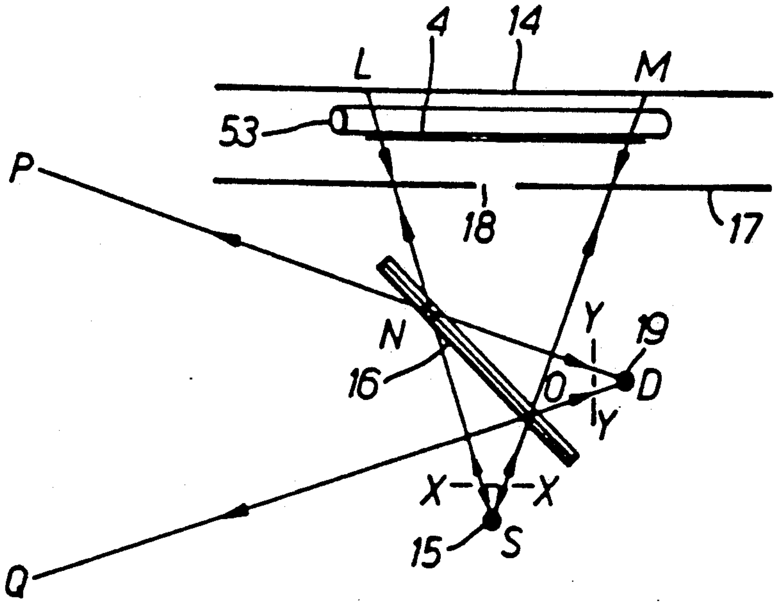
Fig.6A
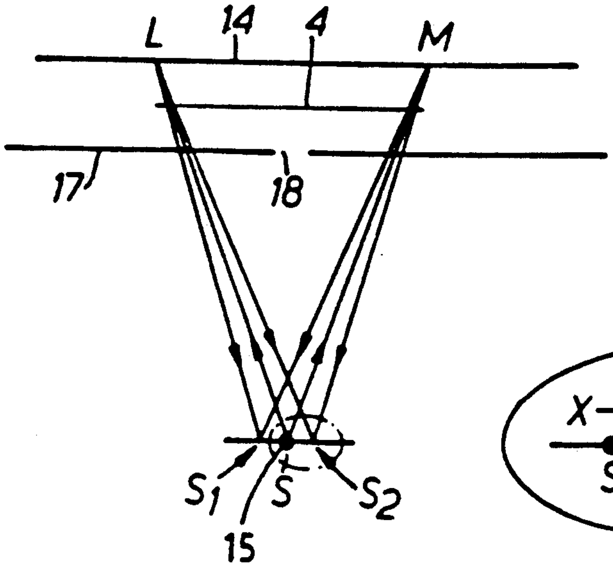
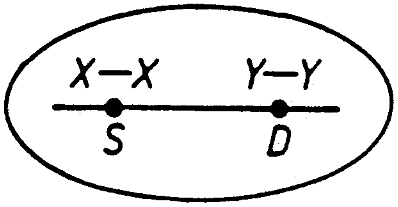
Fig.6B

SHEET INSPECTION METHOD AND APPARATUS HAVING RETROREFLECTING MEANS

FILED OF THE INVENTION

The invention relates to sheet inspection methods and apparatus, for example for inspecting the condition of used banknotes.

DESCRIPTION OF THE PRIOR ART

In a used banknote sorting system, a common requirement is to be able to separate banknotes which are fit for reissue from those which are not. Holes, tears, and missing portions of a note are usually deemed to make a note unfit for reissue. Used note sorting (UNS) systems are therefore generally provided with detector systems to allow the detection of any hole, tear, or missing portion.

In EP-A-0070621 we describe apparatus which relies on the monitoring of light transmitted through a document to detect the presence of holes, tears and the like. The presence of any hole, tear, or missing portion causes a change in the amount of light transmitted. The light transmitted is detected by a photosensitive element, and so the output of the detector changes when there is a hole, tear, or missing portion. This change is analysed by subsequent processing circuitry. The apparatus described has a light source, a first fibre optic assembly (the illumination fishtail) which directs light on to a strip of the banknote; a second fibre optic assembly (the collection fishtail) for collecting light passing through the note; one or more photodiodes which generate output currents proportional to the light falling on them; and one or more sets of processing electronics responsive to the output signals from the photodiodes.

Although this known system works reasonably well, it does have a number of disadvantages. For example, the performance of the detector is dependent on the printed pattern and soiling of the document: the variations in printing and soiling are approximately of the same magnitude as those caused by small (say, 2 mm × 2 mm) holes, tears, and missing portions, which need to be detected. This can be overcome to some degree by the use of sophisticated processing techniques, but the cost can be prohibitive for small systems. It is also possible to restrict the interrogated area by reducing the width of the illuminated strip, or by using more than one detection channel, each corresponding to only a part of the collection fishtail, and having its own photodetector and processing circuitry. The presence of a hole, tear, or missing portion then causes a greater proportional change and so is more easily detectable. These solutions incur added expense. Also, the fibre optic assemblies require expert design and assembly, and so are expensive.

GB-A-2054835 describes apparatus for examining substantially transparent sheets for flaws. Two beams, means for scanning the beams in a direction perpendicular to the direction of motion of the sheet, and one or two gratings are required.

EP-A-0182471 is similar to the British specification mentioned above in that it describes apparatus for examining substantially transparent sheets with reflected radiation being used to form an image on a sensor.

SUMMARY OF THE INVENTION

In accordance with one aspect of the present invention, a method of inspecting a sheet with radiation to which the sheet is substantially opaque comprises irradiating the sheet with the radiation; retroreflecting radiation which has passed through the sheet; and detecting the retroreflected radiation after it has passed through the sheet.

We have managed to design a much simpler system for inspecting sheets by using radiation to which the sheet is substantially opaque.

In accordance with another aspect of the present invention, sheet inspection apparatus for carrying out a method according to the first aspect of the invention comprises a radiation source for irradiating a sheet; retroreflection means on to which radiation from the source impinges after having passed through a sheet; and detection means for detecting radiation reflected through the sheet by the retroreflection means .

This new system retains the concept of using the absorption of radiation by a sheet or document to detect holes, tears, and missing portions, but uses retroreflection means to ensure that a radiation beam is reflected back substantially along the same path after passing through the sheet. This increases the "contrast" between any flaws in the sheets and remainder of the sheet.

In one arrangement, the apparatus further comprises a radiation beam splitter through which radiation from the source passes to the sheet, the beam splitter causing radiation reflected by the retroreflection means to be reflected away from the source on to the detection means. In other examples, advantage can be taken of the generally imperfect behaviour of practical light sources and practical retroreflective films. Thus, the detection means can be positioned adjacent to the source without the need for a beam splitter.

Radiation passing through the sheet which does not fall onto the retroreflective sheet is not reflected back substantially along the same path. The area of the sheet under interrogation is therefore determined by the size and shape of the retroreflective film. As the film may be cut to almost any required shape, small interrogated areas may be achieved without the need for carefully focused optical systems.

In some cases, it may be advantageous to restrict the area of the sheet from which the illumination can be reflected. In this case, the apparatus may further comprise a mask having an aperture through which radiation passes to impinge on the detection means.

The radiation generated by the source will typically comprise visible or near infra-red radiation, particularly where paper or similar materials are being inspected. However, with certain materials other wavelengths may be more suitable. For example, when measuring some plastics which are transparent to visible light, operation at a wavelength in the range 3 to 10 micrometers, where the plastic is opaque, would be preferable. Furthermore, provided a suitable source, retroreflection means, and detection means can be found it is feasible to work at any part of the electromagnetic spectrum. For instance, operation at millimetric radar wavelength is possible using standard radar transmitters and receivers, and using an array of small corner reflectors for the retroreflection means.

In general the radiation is chosen which is most suitable for the sheet under test. That is, the sheet should be substantially opaque to the radiation. If radiation of intensity I impinges on the sheet and is attenuated to intensity tI on passing through the sheet then t is preferably less than 0.1 and is typically about 0.05.

Although the apparatus could be used to inspect a stationary sheet, it has most use when incorporated into a system which includes means for causing relative movement between the apparatus and a sheet. Typically, this means will comprise a conveyor for carrying separate sheets past the apparatus although the invention is also suitable for inspecting continuous webs of paper, metal, and the like. Of course, as an alternative, the relative movement means could cause movement of the inspection apparatus while the sheet is kept

BRIEF DESCRIPTION OF THE DRAWINGS

Some examples of banknote inspection apparatus according to the invention will now be described and contrasted with known apparatus with reference to the accompanying drawings, in which:

FIG. 5 illustrates schematically one example of apparatus according to the invention;

FIG. 6A illustrates a second example of apparatus according to the invention;

FIG. 6B is an enlarged view of the portion of FIG. 6A indicated by an oval dot-dash line.

DETAILED DESCRIPTION OF AN EMBODIMENT

Figure 1:
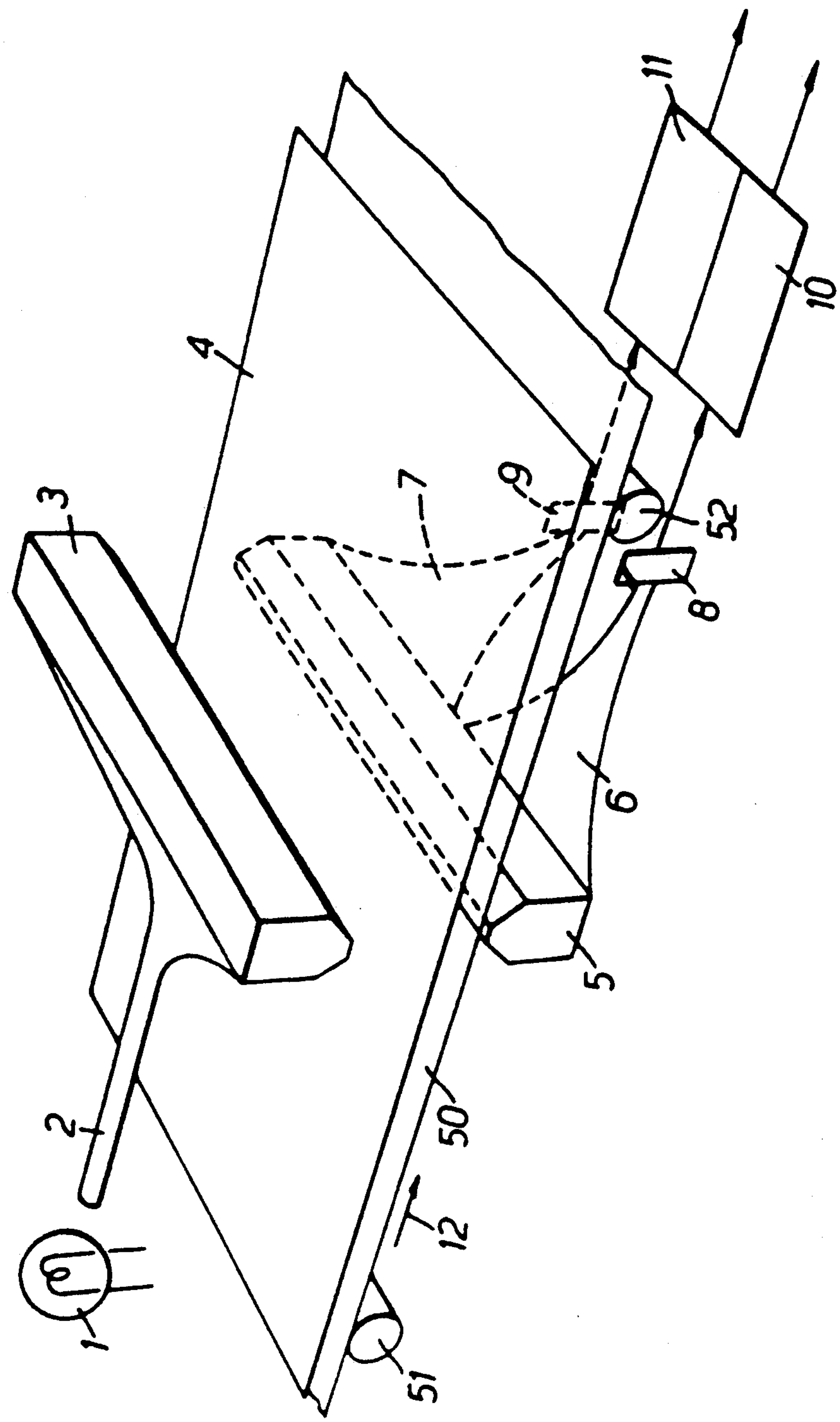
FIG. 1 is a schematic view of known apparatus.

The conventional apparatus shown in FIG. 1 is described in more detail in EP-A-0070621. Briefly, the apparatus comprises an incandescent light source 1 which generates light which is channelled through a set of optical fibres 2 into an illumination fishtail 3 which causes a curtain or strip of light to impinge on a banknote 4 under test.

A collection fishtail 5 is positioned beneath the banknote 4 in alignment with the illumination fishtail 3 and two optical fibre bundles 6,7 collect transmitted light and pass them to respective photodiodes 8,9 which generate respective electrical signals related to the intensity of the light received by the photo diodes. These intensity signals are fed to respective sets of processing electronics 10,11 which generate respective output signals which indicate the presence or otherwise of holes, tears, and missing portions in the banknote 4. These processing electronics 10,11 may have selectable "thresholdz" values so that only the presence of holes, tears, or missing portions above a certain size are indicated.

In operation, the banknote 4 is fed between the fishtails 3,5 in a direction indicated by arrow 12 with its short edge leading on a conveyor 50 driven over rollers 51, 52. Typically, the collection fishtail 5 has a width of about 100 mm which, in the case of most banknotes, will cover the full width of the banknotes. The collection fishtail 5 is about 1 mm long and collects light from a section of the document about 3 mm long.

Figure 2:
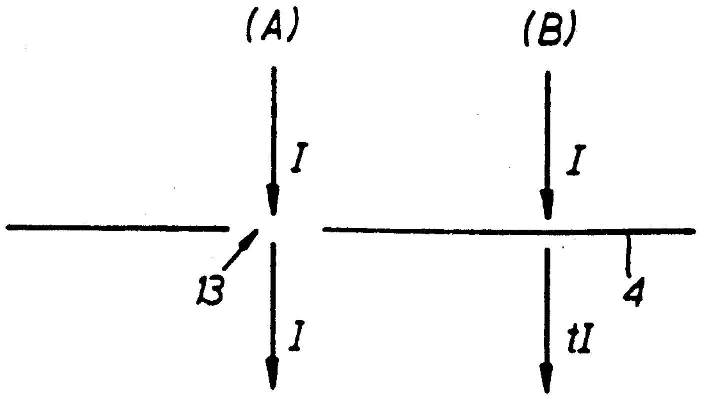
FIG. 2 illustrates the passage of light through a banknote during operation of the FIG. 1 apparatus.

FIG. 2 illustrates the transmission of light through the banknote 4. A beam (A) of light of intensity I passes through a hole 13 in the document 4 with negligible attenuation. A similar beam (B) passing through the document is attenuated so that its intensity is tI (t is of the order of 0.05). The contrast of the measurement is then tI/I, or about 20:1.

Figure 3:
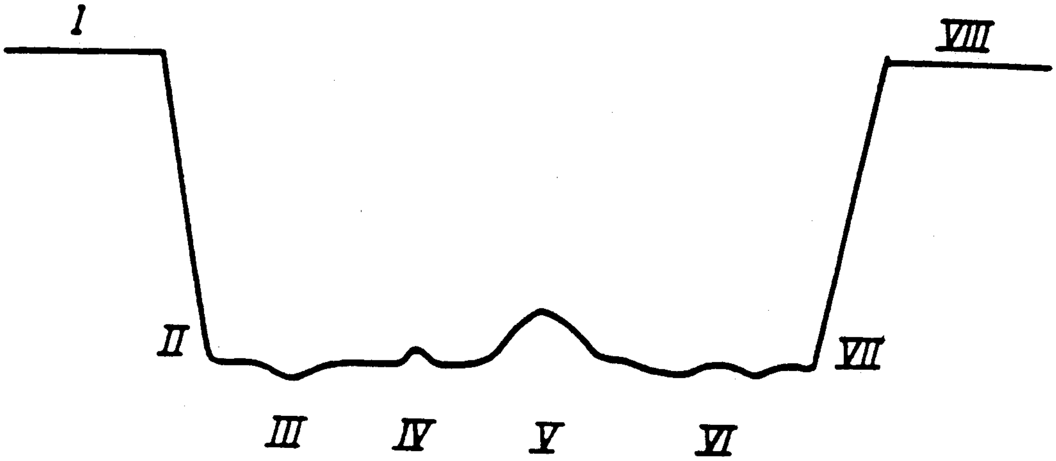
FIG. 3 illustrates an output signal from the processing electronics of the FIG. 1 apparatus.

A typical output trace is shown in FIG. 3. This figure shows a number of features of the output of this detector. At I, when there is no document between the fishtails, the output is high. At II, as the leading edge of the document enters the fishtails, the output falls to a lower level, where it generally remains until VII, when the trailing edge of the document leaves the fishtails, and the output again rises to the no document level at VIII.

In the section II to VII, there are a number of variations in the output. That at III is typical of the reduction in transmitted light caused by localised heavy printing. Those at IV and V are typical of increases caused by small and large holes respectively. The variations at VI are typical of the effects of the printed pattern on the document.

It can be seen from FIG. 3 therefore that the performance of the detector is dependent on the printed matter and soiling of the banknote and since the variations of transmitted light due to these features are approximately the same as those caused by small holes and tears etc. this can lead to difficulties in detecting such holes and tears.

Figure 4:
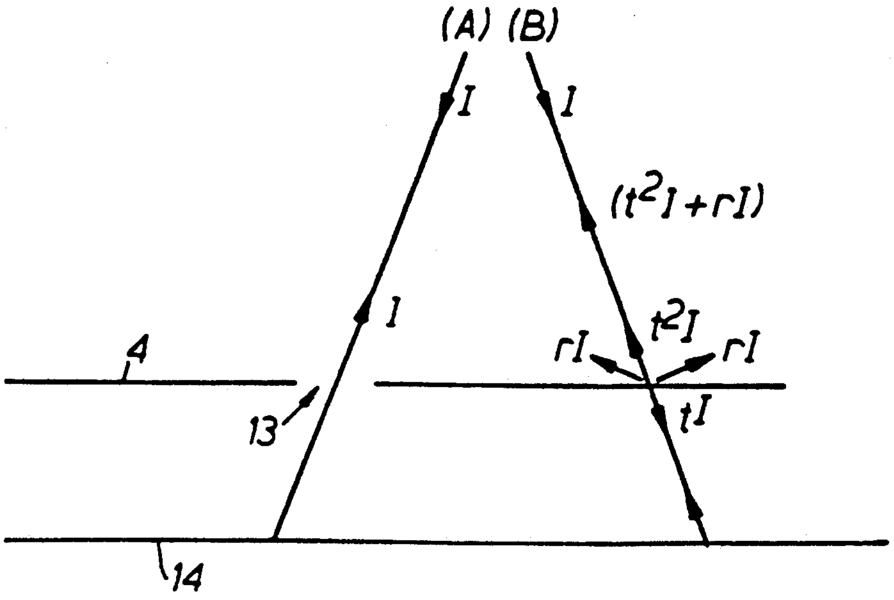
FIG. 4 illustrates the light beam path in apparatus according to the invention.

FIG. 4 illustrates the principle of the invention which deals with these problems of contrast. Essentially, a retroreflector, in this case a retroreflective, film 14 is positioned beneath the banknote 4 so as to reflect light passing through the banknote substantially back along its original path rather than being reflected in a diffuse or specular manner. An example of a film which could be used is the type 7610 or 7615 manufactured by the 3M Company. In this case, a beam of light (A) of intensity I passes through a hole in the document and is reflected back on itself with negligible attenuation. A second beam of light (B) passing through the document is attenuated by the document so that its intensity on the far side of the banknote 4 is tI. This second beam (B) is then reflected back on itself and attenuated again as it passes through the banknote 4 a second time so that its intensity is now $t^2I$. There is also a reflected part of the incident beam of intensity rI. The contrast of the measurement is now $$(t^2I+rI)/I=t^2+r$$

$t^2$ is of the order of 0.0025, and as the reflections are generally diffuse rather than specular, r is of the order of 0.01. The contrast of the measurement is thus increased.

Figure 7:
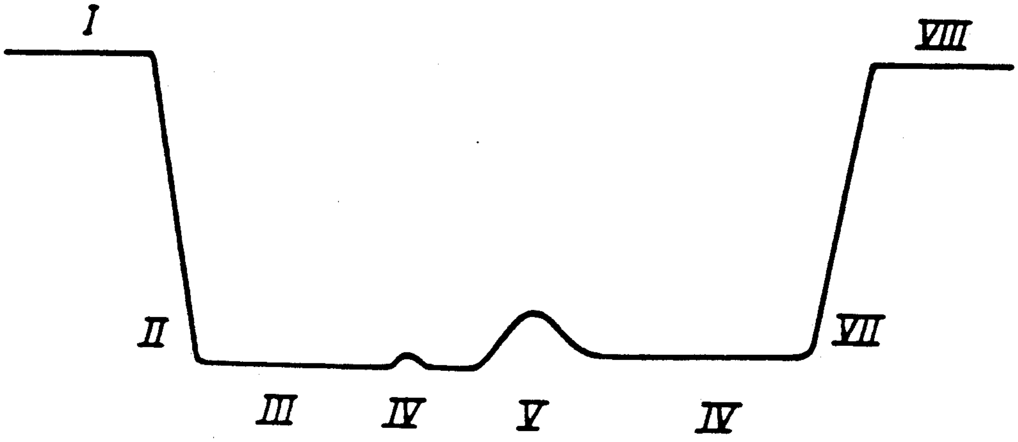
FIG. 7 illustrates the output signal generated by the system shown in FIG. 5.

A typical output trace similar to that shown in FIG. 3 is shown in FIG. 7. The general form is similar to that of the existing detector. At I, when there is no document obscuring the retroreflective screen 14, the output is high. At II, as the leading edge of the document enters the detector, the output falls to a lower level, where it generally remains until VII when the trailing edge of the document leaves the detector, and the output again rises to the no document level at VIII.

The variations at IV and V are typical of those caused by small and large holes respectively; these changes are similar to those obtained on the existing detector. The variations at III (where there is heavy printing) and at VI (where there is a heavy printed pattern) are much smaller than those obtained with the existing detector leading to a significant improvement of contrast.

FIG. 5 illustrates schematically one example of apparatus for implementing the invention. In this case, a small source of infra-red light 15 generates a light beam, part of which passes through a beam splitter 16. A screen 17 having a slit 18 is optionally positioned between the beam splitter 16 and the path of the banknote 4 so as to restrict the area of the banknote 4 under illumination. The banknote 4 passes beneath the screen 17 while being fed between spaced rollers, one of which 53 is shown. Radiation passing through the slit 18 impinges on the banknote 4 and any radiation passing on through the banknote via holes, tears and the like will impinge on the retroreflective film 14. Typically, the film 14 will extend across the width of the banknote, and a few millimeters along the direction of the length of the banknote, so defining an interrogated area a few millimeters wide across the banknote. Retroreflected light passes back through the sheet and the slit 18 to the beam splitter 16 where it is partially reflected on to a detector system 19 which may comprise a collection fishtail and sensor. Typically, the beam splitter 16 has the property of allowing a portion (usually 50%) of the light incident upon it to pass straight through it while the remainder is reflected in a specular manner.

A modification of the FIG. 5 example is shown in FIG. 6A and 6B in which the beam splitter 16 has been omitted. This arrangement relies on the imperfect behaviour of practical light sources and practical retroreflective films. An ideal point source would have zero size, and an ideal film would reflect incident light directly back along its path to form an image which is also of zero size. In practice, however, the source has finite dimensions, and the film causes the reflected beam to diverge. The beam width is small, usually less than one degree, but it is finite. These two effects combine to form an image which is not of zero size.

In this example, the source 15 illuminates the screen 17, banknote 4, and retroreflective film 14 directly and the light is reflected back by each of these components to illuminate an area $S_1$ to $S_2$. The detection element (not shown) can then be placed anywhere within this area. Again, the screen 17 can be omitted if required.

When a beam of light is reflected from a surface the polarization of the beam may be changed. Such a phenomenon is used in the design of light emitting displays: using a circular polarizer it is possible to improve the contrast between- the (wanted) light emitted from the display and the (unwanted) external light incident on, and then reflected from, the display.

It is possible to add polarizers to the systems shown in FIGS. 5 and 6A at positions marked X—X and/or Y—Y. (In the system of FIG. 6, it may be possible to use the same piece of material). Normally circularly polarizing material would be used, but it is possible to use other types to suit particular surfaces having particular reflective properties.

For wide sheets or webs, it is possible to use a number of source/sensor pairs with one retroreflective strip/-screen/slit combination. Each source/sensor pair would not interfere substantially with its neighbours, as incident light from a particular source is reflected back to the corresponding sensor.

We claim:

1. A method for detecting the presence of holes, tears and missing portions of a sheet which is substantially opaque, said method comprising the steps of:

(a) irradiating said sheet with radiation so that said radiation passes through said sheet with relatively low attenuation in areas where holes, tears and missing portions of said sheet exist and with relatively high attenuation in areas where holes, tears and missing portions of said sheet do not exist;

(b) retroreflecting said attenuated radiation back through said sheet;

(c) detecting said retroreflected radiation after it passes through said sheet; and (d) determining, whether holes, tears and missing portions exist in said sheet as a function of said detected retroreflective radiation.

2. A method according to claim 1, further including the step of transporting said sheet along a path, said radiation being retroreflective by retroreflective means in the form of a strip extending across said sheet transverse to said transporting direction.

3. Apparatus for detecting the presence of holes, tears and missing portions of a sheet which is substantially opaque, said apparatus comprising:

(a) irradiating means for irradiating said sheet with radiation so that said radiation passes through said sheet with relatively low attenuation in areas where holes, tears and missing portions of said sheet exist and with relatively high attenuation in areas where holes, tears and missing portions of said sheet do not exist;

(b) retroreflecting means for retroreflecting said attenuated radiation back through said sheet;

(c) detecting means for detecting said retroreflected radiation after it passes through said sheet; and (d) determining means for determining whether holes, tears and missing portions exist in said sheet as a function of said received retroreflected radiation.

4. Apparatus according to claim 3, further comprising a beam splitter through which radiation from said means for irradiating said sheet passes before impinging on said sheet, and wherein radiation reflected by said retroreflection means is reflected by said beam splitter towards said detecting means.

5. Apparatus according to claim 3, further comprising a screen having an aperture to limit the radiation which impinges on said detecting means.

6. Apparatus according to claim 3, further comprising polarizing means positioned so as to substantially eliminate external radiation from impinging on said detecting means.

7. Apparatus according to claim 3, wherein said means for irradiating said sheet generates radiation in the visible or infrared range.

8. Apparatus according to claim 3, wherein said retroreflection means is in the form of a strip.

9. Apparatus according to claim 3, wherein said retroreflection means comprises a retroreflective film.

10. Apparatus according claim 3, further including means for causing relative movement between said sheet and said irradiating means in such a manner that said sheet is scanned with said radiation.

11. Apparatus according to claim 10, wherein said means for causing relative movement comprises a sheet conveyor.

12. Apparatus for detecting the presence of holes, tears and missing portions of a sheet which is substantially opaque, said apparatus comprising:

(a) first and second irradiating means for irradiating respective portions of said sheet with respective beams of radiation so that said beams of radiation pass through respective portions of said sheet with relatively lower attenuation in areas where holes, tears and missing portions of said sheet exist and with relatively high attenuation in areas where holes, tears and missing portions of said sheet do not exist;

(b) means for retroflecting said first and second attenuated beams of radiation back through said sheet;

(c) first and second means for detecting said first and second beams of retroreflected radiation, respectively, after they pass through said sheets; and (d) means for determining whether holes, tears and missing portons exist in said sheet as a function of said first and second detected retroreflected radiation beams.

13. Apparatus according to claim 12 wherein a single retroreflective means is used to retroreflect both said first and second attenuated beams of radiation back through said sheet.

* * * * *